MECHANICAL INHIBITOR FOR ELIMINATING EXTRANEOUS SIGNALS IN A MAGNETIC MEMORY UNIT

Filed March 18, 1963

INVENTORS
JOHN L. ROTHERY
JAMES W. HEALY

BY
Fryer & Tjensvold
ATTORNEYS

United States Patent Office 3,293,628
Patented Dec. 20, 1966

3,293,628
MECHANICAL INHIBITOR FOR ELIMINATING EXTRANEOUS SIGNALS IN A MAGNETIC MEMORY UNIT

John L. Rothery, Concord, and James W. Healy, Wakefield, Mass., assignors to Dasa Corporation, a corporation of California Filed Mar. 18, 1963, Ser. No. 265,955
2 Claims. (Cl. 340—174.1)

Figure 1:
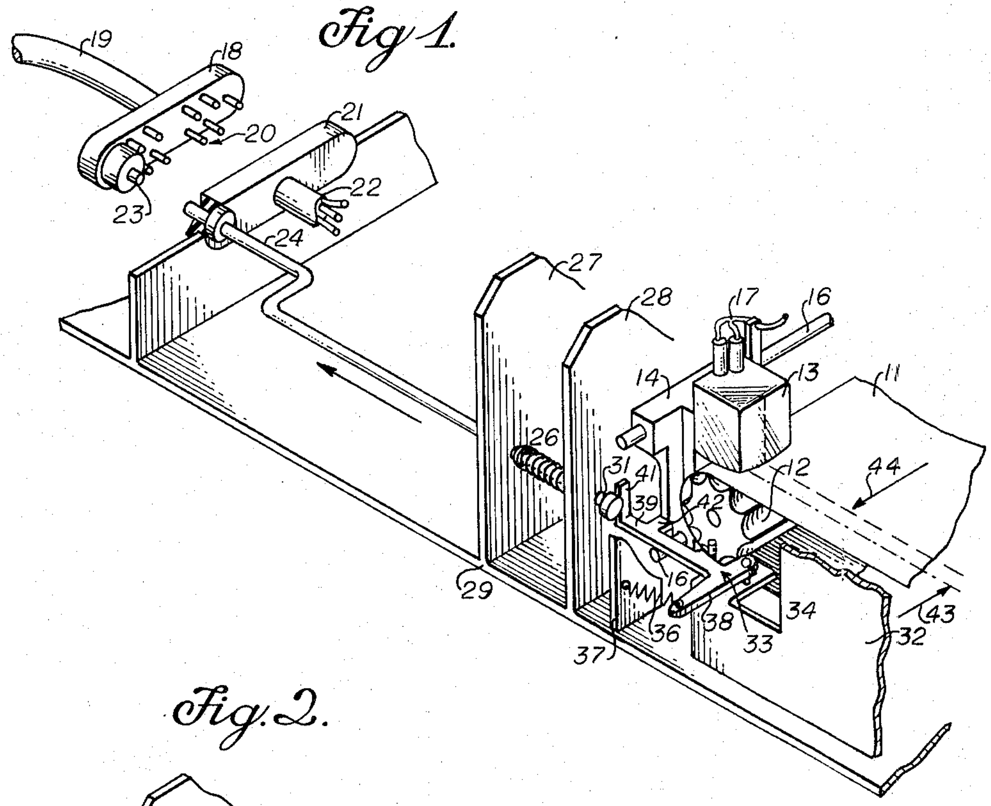

The present invention relates to magnetic memory information storage units and more particularly to such units in combination with transducer means for placing information into and recalling information from the storage unit.

There are a number of devices which are known in the art which employ magnetic memory units of the type which include a relatively wide magnetic tape which has information disposed transverse to the length of the tape. In this manner the tape has a large number of positions along its length at which different information is stored. These magnetic memory units characteristically employ a magnetic transducer head to initially place information onto the tape and subsequently read the information which exists on the tape.

In operation the magnetic tape is positioned such that a desired location along its length is aligned with the transducer head and the transducer head is then moved across the width of the tape reading the information which is contained at that particular location of the tape. The information which the transducer head reads in passing over the tape is initially put onto the tape by the transducer head passing over the tape at the same time that information is electronically supplied to the head.

One of the problems which exists when a magnetic media and transducer head are operated in the general manner described above is the introduction of extraneous information when the head scans a location at which information has been previously placed. When information is placed onto the tape at a desired location along the length of the tape, the head is generally positioned at one edge of the tape which is referred to as the starting edge. The drive means, when initiated, accelerates the head from its starting position across the tape until a scan speed is achieved, after which time the desired information is applied electronically to the head and thus to the magnetic tape. In going from rest to the desired scan speed the head necessarily traverses a certain width of the tape and it is not uncommon for extraneous, unwanted signals, not forming part of the desired information, to be placed on the tape. When the head is subsequently returned to the start position for the purposes of reading the information which was previously distributed across the width of the tape, the initial width of the tape which the head reads may include the unwanted signals and thus cause an erroneous output signal.

Accordingly, it is an object of the present invention to eliminate erroneous signals which are caused by a transducer head reading unwanted signals which exist at the initial portion of an information location on a magnetic media.

Further objects and advantages of the present invention will be made apparent in the following specification wherein a preferred form of the invention is described by reference to the accompanying drawing.

Figure 2:
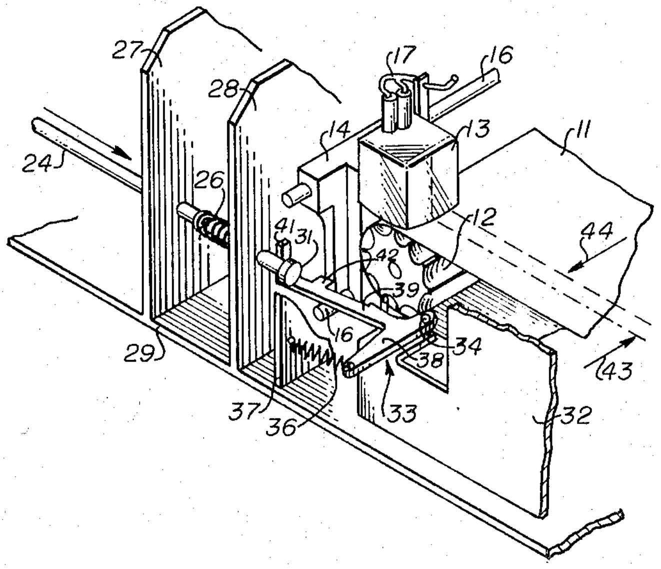

In the drawing:

FIG. 1 is an isometric illustration of a magnetic media and associated transducer head with the system conditioned to read information; and FIG. 2 is an isometric illustration similar to FIG. 1 wherein the components of the device are shown in the position which they assume when the device is conditioned to record information onto the magnetic media.

Referring now to the drawing, a magnetic tape 11 is supported at one end by a roller 12 and disposed so as to pass below a magnetic transducer head 13. Transducer head 13 is mounted on a carriage 14 which is slidably mounted on a pair of support rods 16 such that the carriage and head are slidable in a direction transverse to the length of tape 11. A pair of lead wires 17 direct signals to the head 13 when the head is conditioned to record information and transmit signals which are read by the head 13 when the head is conditioned to read information.

The present invention is particularly, though not exclusively, applicable for use with a device which is conditioned for recording by plugging an additional piece of equipment into the unit which contains the magnetic storage means. Thus, FIG. 1 illustrates a multi-pronged male plug 18 having an electrical conductor 19 for connection to an information generating means and a mating female receiving plug 21 having a conductor 22 which is effectively connected to conductor 19 when the two plugs are properly joined. Besides the electrical prongs 20 plug 18 also includes a mechanical prong 23 which abuts a slidable rod 24 when plug 18 and receiving plug 21 are joined. When plug 18 is not joined to receiving member 21—the memory unit is conditioned to read information rather than record information—the position of rod 24 is determined by a spring 26 which is associated with and applies a force to the rod 24. When the system is to be conditioned such that information can be recorded onto the magnetic tape 11, plug 18 is joined with receiving member 21 and prong 23 abuts rod 24 so as to counteract the force of spring 26 and change the longitudinal position of rod 24. It is through the positioning of rod 24 that the possibility of error due to the unwanted signal which often occurs at the initial portion of the magnetic tape location is eliminated.

Rod 24 passes through a pair of spaced apart upstanding support members 27 and 28 which are affixed to a base plate 29. The end of rod 24 which extends beyond plate 29 terminates in an enlarged disc 31 which has a greater diameter than the rod 24.

Another upstanding support member 32 which is also affixed to base plate 29 supports a stop member 33 which cooperates with rod 24, disc 31, and carriage 14 to provide the desired results set out above. Stop member 33 is pivotally mounted on support 32 at 34 and urged to rotate clockwise about that pivot point by a spring 36 which is secured between a fixed mounting plate 37 and a point on stop member 33 at a distance from pivot point 34. The point at which spring 36 is affixed to stop member 33 is at or near the end of a leg 38 of stop member 33. Stop member 33 also includes a second leg 39 which is generally perpendicular to leg 38 and is disposed at a vertical distance below the lowest point of disc 31. Leg 39 terminates in an upstanding vertical member 41 which provides stop member 33 with a portion that rises vertically above the lowest point of disc 31.

Referring particularly to FIG. 2, carriage 14 is driven leftwardly by its drive means (not shown) with a force sufficient to overcome the force of spring 36 and thus pivot stop 33 in a counter-clockwise direction by virtue of the contact between carriage 14 and horizontally extending member 42 which is part of the stop member 33. Since FIG. 2 illustrates the mechanism with the rod 24 urged toward supports 27 and 28 (as indicated by the arrow), enlarged portion 31 will be urged to a position forwardly from vertical extending member 41 such that the counter-clockwise rotation of member 33 will stop when vertical member 41 contacts rod 24. This places head 13 at a transverse position on tape 11 generally indicated by dotted line 43. The mechanism is then conditioned to drive the head 13 rightwardly (as shown) until it reaches its scanning speed at which time information is introduced through lead wires 17. A second dotted line 44 which is generally parallel to line 43 indicates the approximate transverse position at which the head is brought up to its scan speed. The width of tape between lines 43 and 44 does not include any information which is purposely recorded thereon but as discussed above may very likely have recorded thereon unwanted signals which could, if subsequently read, introduce error into the output signal. To avoid reading the signals which may appear between lines 43 and 44 the components of the device are positioned as shown in FIG. 1 when the head is to be employed as a reading device rather than a recording device.

Referring to FIG. 1, the rod 24 has moved leftwardly (as indicated by the arrow) by the force of spring 26, in the absence of prong 23 acting on the end of rod 24. The leftward movement of rod 24 causes the enlarged disc 31 to also move leftwardly and be in alignment with vertical member 41. Under these conditions when the head 13 and carriage 14 are moved leftwardly, the counter-clockwise rotation of stop member 33 will come to a halt when member 41 contacts disc 31 and thus place the head in alignment with line 44 rather than line 43. By providing the head 13 with two different starting points depending upon the operation which the head is to perform, a complete elimination of the potentially erroneous information between lines 43 and 44 is successfully achieved.

While the present invention has been described with reference to its operation in connection with a plug type arrangement the invention has equal applicability with systems not employing plug-in units in which case push rod 24 would be positionable by means of a suitable mechanism including means for maintaining the rod in the desired position.

We claim:

1. In a magnetic information storage system including a magnetizable medium and a transducer head disposed for movement relative to the medium the combination comprising:

coupling means for detachably associating an information generation means with the medium and head, said means having an engaged condition and a disengaged condition;

adjustable stop means disposed in the path of the head for limiting the travel of the head in one direction;

means associated with said stop means and said coupling means, and responsive to said coupling means being in its engaged condition to adjust the stop means to limit the travel of the head to a position further in the one direction than the stop means allows the head to travel when the coupling means is disengaged.

2. The system of claim 1 wherein said coupling means includes a male plug and a female receiving member, said male plug including a prong which mates with a rod associated with said receiving member when said plug and receiving member are engaged, said rod being adjusted thereby to control said stop means.

References Cited by the Examiner

UNITED STATES PATENTS

| | | | |
|---|---|---|---|
| 2,733,425 | 1/1956 | Williams et al. | 340—174.1 |
| 3,200,385 | 8/1965 | Welsh | 340—174.1 |

BERNARD KONICK, *Primary Examiner*.

A. I. NEUSTADT, *Assistant Examiner*.